(12) United States Patent
Yalla

(10) Patent No.: US 12,043,388 B2
(45) Date of Patent: Jul. 23, 2024

(54) PASSENGER SEAT VOICE RECORDING UNIT

(71) Applicant: B/E Aerospace, Inc., Winston-Salem, NC (US)

(72) Inventor: Venkata Sumanth Yalla, Telangana (IN)

(73) Assignee: B/E Aerospace, Inc., Winston-Salem, NC (US)

( * ) Notice: Subject to any disclaimer, the term of this patent is extended or adjusted under 35 U.S.C. 154(b) by 412 days.

(21) Appl. No.: 17/484,149

(22) Filed: Sep. 24, 2021

(65) Prior Publication Data

US 2023/0034020 A1 Feb. 2, 2023

(30) Foreign Application Priority Data

Jul. 28, 2021 (IN) .............................. 202141033954

(51) Int. Cl.
*B64D 11/00* (2006.01)
*B64D 11/06* (2006.01)

(52) U.S. Cl.
CPC .... *B64D 11/00155* (2014.12); *B64D 11/0606* (2014.12); *B64D 11/0629* (2014.12)

(58) Field of Classification Search
CPC ....... H04R 2499/13; G10K 2210/3221; G10K 2210/128; G10K 2210/1281; G10K 2210/1282; G10K 2210/1283; B64D 11/0629; B64D 11/0606; B64D 11/00155
See application file for complete search history.

(56) References Cited

U.S. PATENT DOCUMENTS

| | | | |
|---|---|---|---|
| 5,808,661 A | 9/1998 | Infiesto et al. | |
| 5,835,127 A | 11/1998 | Booth et al. | |
| 7,171,003 B1* | 1/2007 | Venkatesh | H04M 9/082 |
| | | | 381/86 |
| 7,364,119 B2 | 4/2008 | Sprenger et al. | |
| 2002/0109647 A1 | 8/2002 | Crandall et al. | |
| 2009/0146004 A1* | 6/2009 | Plant | B64D 11/0643 |
| | | | 244/118.5 |
| 2011/0143835 A1* | 6/2011 | Sizelove | G06F 1/1624 |
| | | | 463/31 |
| 2014/0046724 A1 | 2/2014 | Neag et al. | |

(Continued)

FOREIGN PATENT DOCUMENTS

| | | |
|---|---|---|
| WO | 1995029552 A1 | 11/1995 |
| WO | 1999011048 A1 | 3/1999 |
| WO | 2012162381 A1 | 11/2012 |

*Primary Examiner* — Jason R Kurr
(74) *Attorney, Agent, or Firm* — Suiter Swantz IP

(57) ABSTRACT

An aircraft seat group is described. The aircraft seat group includes first and second aircraft seats. The seat group also includes a center console between the aircraft seats. The center console includes a microphone unit including an audio transducer. The audio transducer generates a voice recording of a passenger sitting on one of the seats in response to a signal, thereby reducing privacy concerns. The signal is received by one or more of a record button or a communication interface. The voice recording may thus provide one or more of passenger recommendation or flight recordings during emergency conditions. The microphone unit is embedded in one or more of an armrest or a seat back divider of the center console.

17 Claims, 2 Drawing Sheets

(56) References Cited

U.S. PATENT DOCUMENTS

| | | | |
|---|---|---|---|
| 2016/0096626 A1* | 4/2016 | Hoch | B64D 11/00155 |
| | | | 244/118.6 |
| 2016/0297527 A1* | 10/2016 | Everhart | B64D 11/00155 |
| 2017/0293920 A1* | 10/2017 | Leader | H04W 4/42 |
| 2019/0225232 A1* | 7/2019 | Blau | G05D 1/0088 |
| 2020/0156794 A1 | 5/2020 | Dowty et al. | |
| 2020/0396576 A1 | 12/2020 | Herrera et al. | |
| 2021/0166675 A1* | 6/2021 | Soltner | B60N 2/879 |

\* cited by examiner

PASSENGER SEAT VOICE RECORDING UNIT

CROSS-REFERENCE TO RELATED APPLICATION

The present application claims the benefit of India Provisional Patent Application 202141033954, filed Jul. 28, 2021, titled PASSENGER SEAT VOICE RECORDING UNIT, naming Venkata Sumanth Yalla as inventor, which is incorporated herein by reference in the entirety.

TECHNICAL FIELD

The present disclosure generally relates to aircraft equipment and more particularly to passenger accommodations.

BACKGROUND

The traditional way of collecting opinions or feedback from an aircraft passenger is by a written document. Such written documents may be printed on paper leaflets, incurring a financial cost. Such paper leaflets must be physically distributed to the passengers, typically by a flight attendant. Furthermore, passenger engagement may be low such that the paper leaflets may not be filled out by the aircraft passenger. Therefore, it would be advantageous to provide a device, system, or method that mitigates the shortcomings described above.

SUMMARY

An aircraft seat group is disclosed, in accordance with one or more embodiments of the present disclosure. In one embodiment, the aircraft seat group includes a first aircraft seat and a second aircraft seat laterally adjacent to the first aircraft seat. In another embodiment, each of the first aircraft seat and the second aircraft seat include a seat pan and a seat back. In another embodiment, each of the first aircraft seat and the second aircraft seat configurable between an upright position and a lie-flat position. In another embodiment, the aircraft seat group includes a center console disposed between the first aircraft seat and the second aircraft seat. In another embodiment, the center console includes an arm rest including a top surface disposed above the seat pan for resting an arm of a passenger sitting on the first aircraft seat. In another embodiment, the center console further includes a seat back divider disposed between the seat back of the first aircraft seat and the seat back of the second aircraft seat. In another embodiment, the aircraft seat group includes a microphone unit.

In another embodiment, the microphone unit is embedded on the seat back divider adjacent to the seat back of the first aircraft seat. In another embodiment, the microphone unit includes a communication interface by which the microphone unit is communicatively coupled with an aircraft network. In another embodiment, the communication interface is configured to receive a signal from the aircraft network. In another embodiment, the microphone unit includes an audio transducer configured to receive the signal from the communication interface and convert a soundwave generated by the passenger to an electrical signal. In another embodiment, the soundwave is converted to the electrical signal in response to receiving the signal from the communication interface. In another embodiment, the microphone unit includes a memory for storing the electrical signal associated with the soundwave generated by the passenger; wherein the communication interface is further configured to transmit the electrical signal to the aircraft network from the memory.

In another embodiment, the microphone unit is implemented as an in-flight entertainment unit. In another embodiment, the in-flight entertainment unit is embedded on the arm rest. In another embodiment, the in-flight entertainment unit is communicatively coupled with an aircraft network. In another embodiment, in-flight entertainment unit includes a record button configured to generate a signal in response to the passenger pressing the record button. In another embodiment, in-flight entertainment unit includes an audio transducer configured to receive the signal from the record button and convert a soundwave generated by the passenger to an electrical signal in response to receiving the signal from the record button. In another embodiment, in-flight entertainment unit includes a memory for storing the electrical signal associated with the soundwave generated by the passenger. In another embodiment, in-flight entertainment unit includes a communication interface by which the microphone unit is communicatively coupled with the aircraft network. In another embodiment, the communication interface is configured to transmit the electrical signal to the aircraft network.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

Implementations of the concepts disclosed herein may be better understood when consideration is given to the following detailed description thereof. Such description refers to the included drawings, which are not necessarily to scale, and in which some features may be exaggerated, and some features may be omitted or may be represented schematically in the interest of clarity. Like reference numerals in the drawings may represent and refer to the same or similar element, feature, or function. In the drawings.

DETAILED DESCRIPTION OF THE INVENTION

Figure 1:
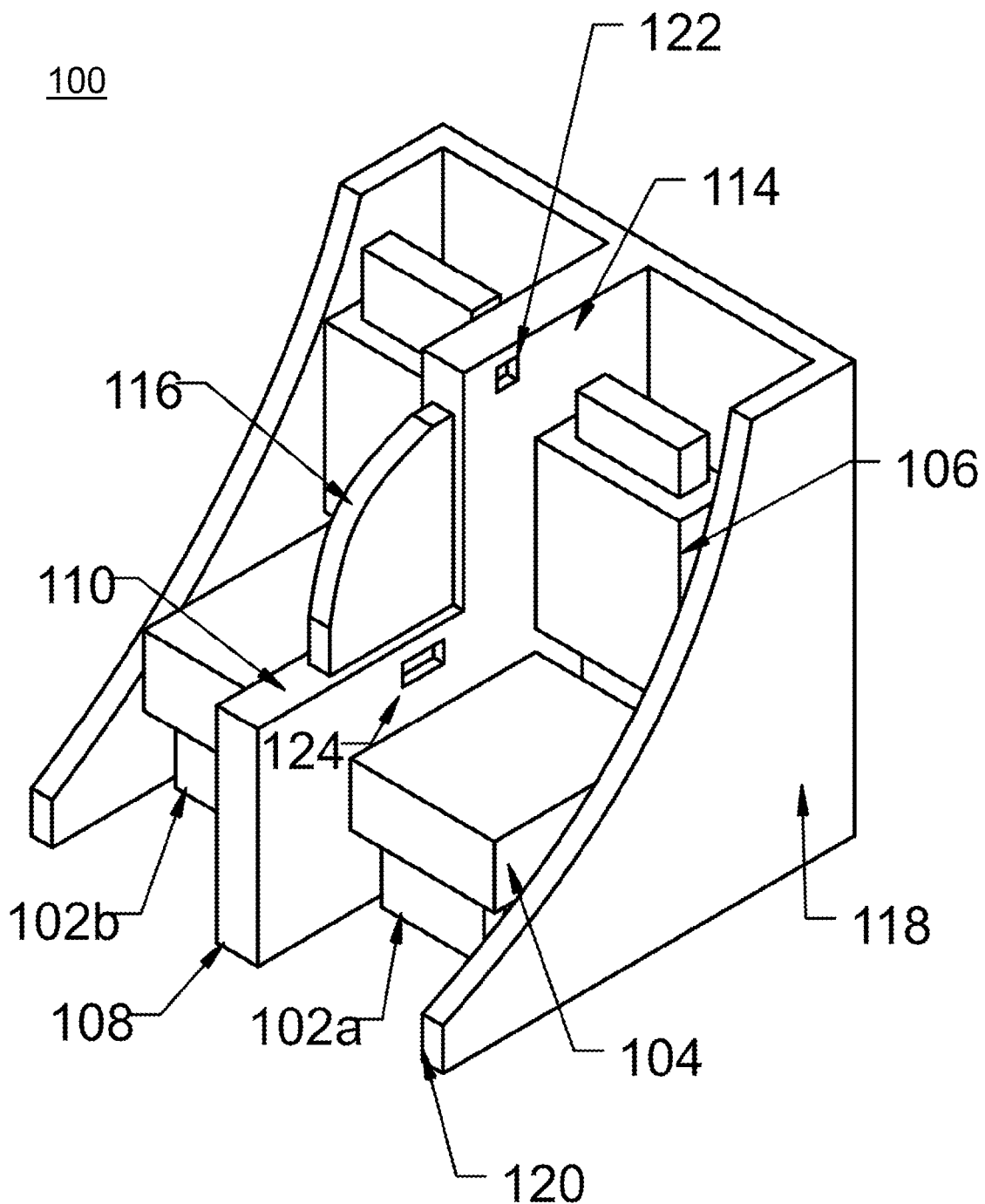
FIG. 1 depicts an aircraft seat group, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Reference will now be made in detail to the subject matter disclosed, which is illustrated in the accompanying drawings. Broadly, embodiments of the present disclosure are directed to passenger voice recording. The passenger voice recording may be accomplished by one or more of a microphone unit or an in-flight entertainment unit of an aircraft seat group. By the passenger voice recording, the passenger may provide suggestion or feedback to the aircraft service provider, such as, but not limited to, business suggestions for providing improved hospitality. Although the passenger voice recording is described for suggestion or feedback, this is not intended as a limitation on the present disclosure. The passenger voice recording may be used as a communication tool to contact a crew member. For example, the passenger voice recording may be provided to the crew member by a text message or voice mail. The passenger voice recording may further be used in the event of an emergency. For example, during the emergency the passenger voice recording may be taken to pass last words to a family member or an aviation incident review board.

Referring now to FIG. 1, an aircraft seat group 100 is described, in accordance with one or more embodiments of the present disclosure. The aircraft seat group 100 may include one or more aircraft seats 102, such as a first aircraft seat 102a and a second aircraft seat 102b. The second aircraft seat 102b may be disposed laterally adjacent to the first aircraft seat 102a. The aircraft seats 102 may include a seat pan 104. The seat pan 104 may include various cushioning material for conforming to a pelvic bone of a passenger. The aircraft seats 102 may also include a seat back 106. Similarly, the seat back 106 may include various cushioning material for conforming to a back of the passenger. The seat back 106 may be coupled with the seat pan 104. The aircraft seats 102 may be configurable between an upright position and a lie-flat position. The aircraft seats 102 may be configurable between the positions at least in part due to the connection seat pan 104 and the seat back 106. The aircraft seat 102 may be configurable between positions including, but not limited to, the upright or raised position, one or more reclined positions, and/or the lie-flat or a bed position. The upright position may be considered a taxi, takeoff, or landing (TTOL) position. In some embodiments, the aircraft seats 102 may be one or more of translated or rotated to be configured between the positions. The aircraft seats 102 may be positioned such that the aircraft seats 102 may face any direction, subject to aviation guidelines or standards, such as, but not limited to a forward or a rearward direction. Furthermore, the aircraft seat group 100 may be positioned in any orientation, subject to aviation guidelines or standards. In some embodiments, the first aircraft seat 102a and the second aircraft seat 102b may face in a substantially similar direction. Although the first aircraft seat 102a and the second aircraft seat 102b are described as facing in a substantially similar direction, this is not intended as a limitation on the present disclosure. In this regard, the first aircraft seat 102a and the second aircraft seat 102b may face a substantially opposite direction or any direction therebetween.

The aircraft seat group 100 may include a center console 108. The center console 108 may be disposed between the aircraft seats 102. The center console 108 may include an arm rest 110. The arm rest 110 may include a top surface 112. The top surface 112 of the arm rest 110 may be disposed at a height above the seat pan 104, such that the passenger sitting on the aircraft seat 102 may rest an arm on the arm rest 110. The center console 108 may also include a seat back divider 114. The seat back divider 114 may be disposed between the seat backs 106 of the first aircraft seat 102a and the second aircraft seat 102b. In some embodiments, the center console 108 may include a deployable partition 116. The deployable partition 116 may be at least partially located within a hollow portion of the seat back divider 114. The deployable partition 116 may be moveable within the hollow portion of the seat back divider 114. In this regard, the deployable partition 116 may be disposed within the hollow portion in a stowed state. The deployable partition 116 may further be at least partially removed from the hollow portion in a deployed state. The deployable partition 116 may include a material for damping a noise, such as, but not limited to, a composite material.

In some embodiments, the aircraft seat group 100 may include a privacy shell 118. The privacy shell 118 may surround a rear portion of the seat back 106 of one or more of the first aircraft seat 102a or the second aircraft seat 102b. In this regard, the first aircraft seat 102a and the second aircraft seat 102b may include a separate privacy shell (not depicted) or the aircraft seat 102a and the second aircraft seat 102b the privacy shell 118. The aircraft seat group 100 may further include an opening 120 by which the passenger may access the aircraft seats 102. Such opening 120 may be defined, at least in part, by the privacy shell 118. In further embodiments, the aircraft seat group 100 may include a door (not depicted) for the opening 120. For example, the door may swing or slide into an open position against the privacy shell 118. By way of another example, the privacy shell 118 may be at least partially hollow, and the door may be slid into a stowage compartment defined by the hollow portion.

One or more of the privacy deployable partition 116, shell 118, or door may damp a transmission of the soundwaves to, from, or within the aircraft seat group 100. In this regard, a background noise from outside of the aircraft seat group 100 may be damped. Furthermore, soundwaves from a passenger sitting on the first aircraft seat 102a or the second aircraft seat 102b may be damped outside of the aircraft seat group 100. Furthermore, the deployable partition 116 may be moved to the deployed state to reduce noise levels from a passenger within the aircraft seat group 100. For example, the deployable partition 116 may be deployed from the stowed state to the fully deployed state to damp the soundwaves of the passenger sitting on the first aircraft seat 102a transmitted to a passenger sitting in the second aircraft seat 102b.

The aircraft seat group 100 may include one or more microphone unit. It is contemplated that the microphone unit may be disposed in at least two positions within the aircraft seat group 100. For example, a microphone unit 122 may be embedded on the seat back divider 114. Such microphone unit 122 may be disposed adjacent to a headrest 126 of the aircraft seat 102. By being disposed adjacent to the headrest 126, a sensitivity of the microphone unit 122 to the passenger's voice may be increased when the passenger is sitting in the upright position. In this regard, the microphone unit 122 may the passengers voice when a decibel of the passenger voice is below a normal conversation level (e.g., below 30 dB) or when a decibel of surrounding noise is higher than normal operating conditions (e.g., during an emergency situation). The microphone unit 122 may be positioned on the seat back divider 114 such that the microphone unit 122 does not interfere with the movement of the deployable partition 116 between the fully deployed state and the stowed state. By way of another example, a microphone unit 124 may be embedded on the armrest 110. In some embodiments, one or more of the microphone unit 122 or the microphone unit 124 is implemented by an in-flight entertainment unit. For instance, the microphone unit 124 is depicted as being an in-flight entertainment unit. Thus, the microphone unit 124 may be functional with minimal adjustment to an aircraft electrical wiring interconnection system (EWIS). It is noted herein that any embodiments directed to the microphone unit 122 and/or the microphone unit 124 may be directed to in-flight entertainment units. Therefore, the above description should not be interpreted as a limitation on the present disclosure but merely an illustration. Furthermore, the aircraft seat group 100 may include both the microphone unit 122 and the microphone unit 124 for each aircraft seat 102.

It is noted herein that one or more components of the aircraft seat group 100 may be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

Figure 2:
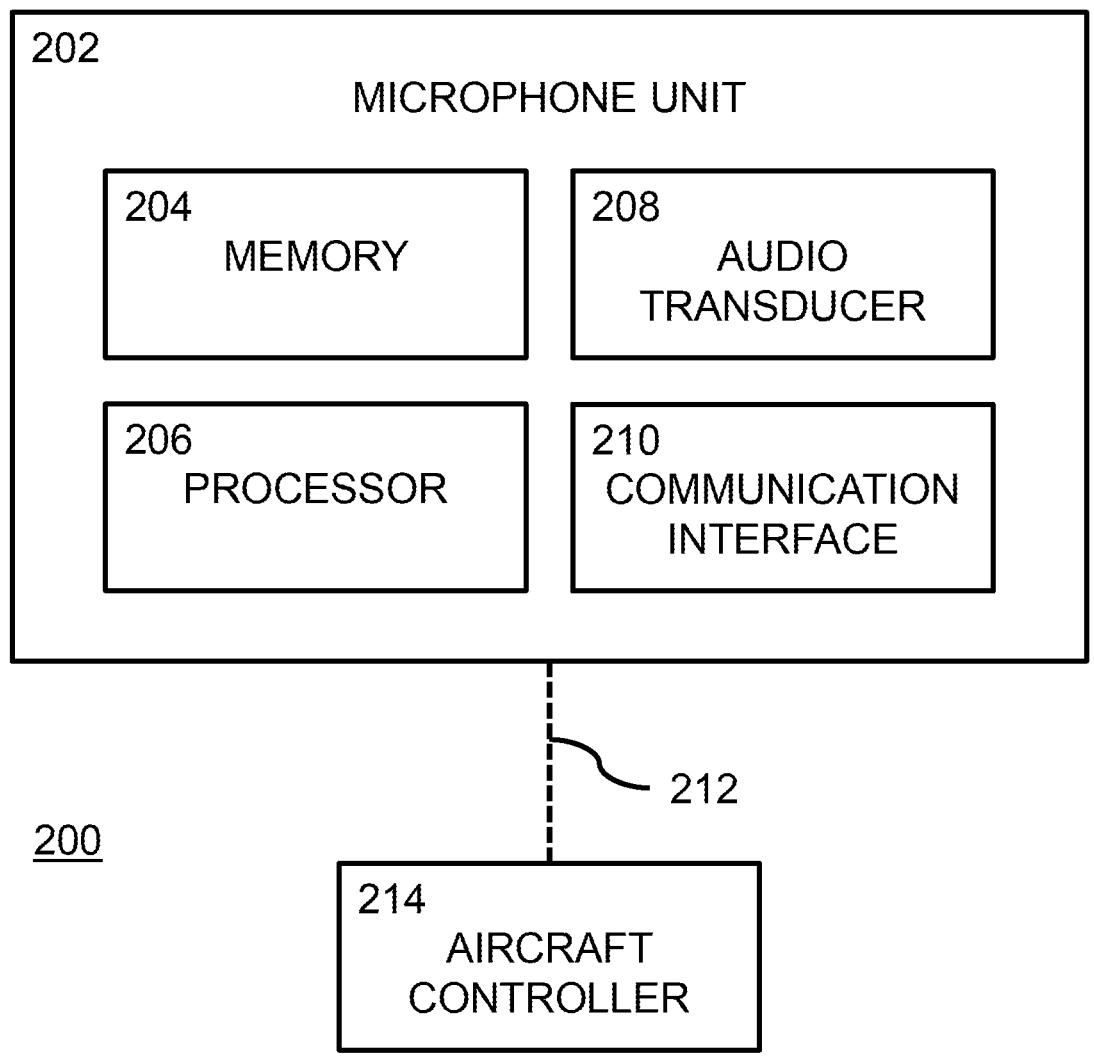
FIG. 2 depicts a simplified control diagram of an aircraft seat group, in accordance with one or more embodiments of the present disclosure.

Referring now to FIG. 2, a simplified schematic diagram of an aircraft seat group 200 is described, in accordance with one or more embodiments of the present disclosure. The embodiments and the enabling disclosure described previously herein in the context of the aircraft seat group 100 should be interpreted to extend to the aircraft seat group 200.

It is further recognized, however, that the aircraft seat group 200 is not limited to the aircraft seat group 100.

The aircraft seat group 200 may include a microphone unit 202 (e.g., microphone unit 122, microphone unit 124). The microphone unit 202 may include a memory 204. The memory 204 may be configured to store data in a medium. The memory 204 may include any storage medium known in the art. For example, the memory 204 may include a non-transitory memory medium. For instance, the memory may include, but is not limited to, a read-only memory (ROM), a random-access memory (RAM), a magnetic or optical memory device (e.g., disk), a magnetic tape, a solid-state drive, and the like.

The memory may be configured to store audio recordings from one or more audio transducers. The memory 204 may store the voice recording for a period of time. In some embodiments, the electronic signal of the voice recording is stored until the electronic signal is transmitted by way of the aircraft network 212. In response to transmission of the electrical signal to the aircraft network, the memory may erase the electrical signal. In other embodiments, the electronic signal may further be retained on the memory subsequent to removal of power from the memory. Therefore, the memory 204 may provide enhanced privacy considerations and meet with emergency power loss considerations.

It is further noted that the microphone unit 202 may include a processor 206. The processor 206 may be configured to execute the program instructions maintained on the memory 204, by which the microphone unit 202 may execute any of the various process steps described throughout the present disclosure. The processor 206 may include any one or more processing elements known in the art. In this sense, the processor 206 may include any microprocessor device configured to execute algorithms and/or program instructions. In general, the term "processor" may be broadly defined to encompass any device having one or more processing elements, which execute a set of program instructions from a non-transitory memory medium, where the one or more sets of program instructions are configured to cause the one or more processors to carry out any of one or more process steps.

The microphone unit 202 may further include an audio transducer 208. The audio transducer 208 may convert soundwaves generated by the passenger to an electrical signal. The audio transducer 208 may include any sound transducer, such as, but not limited to, a dynamic transducer, a ribbon transducer, or a piezo-electric transducer. The memory 204 may store the electronic signal associated with the voice recording. In some embodiments, the memory 204 is located in a common housing with the audio transducer 208. In this regard, the electronic voice recordings may be maintained on the memory 204 prior to transmission over an aircraft network 212, thereby reducing network congestion.

The microphone unit 202 may further include a communication interface 210. The recorded voice signal may be transmitted to the aircraft network 212 by the communication interface. The communication interface 210 may further be configured to receive one or more signals by way of the aircraft network 212. The communication interface may include any interface for communicating with an aircraft network. Thus, the microphone unit may transmit and receive electrical energy, including data and signals, by the communication interface. The aircraft network may include any wireline communication protocol (e.g., DSL-based interconnection, cable-based interconnection, T9-based interconnection, and the like) or wireless communication protocol (e.g., GSM, GPRS, CDMA, EV-DO, EDGE, WiMAX, 3G, 4G, 4G LTE, 5G, Wi-Fi protocols, RF, Bluetooth, and the like) known in the art or any wireline/wireless combination. In this regard, the electrical signal may be wirelessly transmitted by a waveform in a frequency band between 2.4 and 5 GHz. Similarly, the communication interface may be coupled (e.g., physically, electrically, and/or communicatively) to facilitate power and/or data transfer between components of the microphone unit 202 and/or an aircraft controller 214. For instance, the aircraft network may include an electrical wiring interconnection system (EWIS) of an aircraft. Thus, the aircraft controller 214 and/or one or more offboard controllers (not depicted) may be configured to receive and/or acquire data or information by a transmission medium that may include wireline and/or wireless portions. In this regard, the transmission medium may serve as a data link between the microphone unit 202, the aircraft controller 214 and/or the one or more offboard controllers and the microphone unit.

In some embodiments, the microphone unit receives power by way of the communication interface (e.g., by the EWIS). Although the microphone unit is described as being powered by the communication interface, this is not intended as a limitation on the present disclosure. In some embodiments, the microphone unit is a wireless sensor powered by a battery. In this regard, reducing a power consumption of the microphone unit may be desirable to improve the battery life.

In some embodiments, the audio transducer 208 may be considered always-on. In this regard, the audio transducer 208 may continually convert the soundwaves to the electrical signal. For example, the audio transducer 208 may be always-on while passengers are present or during flight. However, the continuous recording of passengers may raise privacy concerns. In this regard, a selective means for recording the passenger voice recording may be implemented. Although the microphone is described as being in an always-on configuration, this is not intended as a limitation of the present disclosure. In some embodiments, the audio transducer is configured to convert the soundwaves generated by the passenger in response to a signal. By only converting the soundwaves in response to a signal, a passenger privacy may be increased. Furthermore, a memory and a power requirement of the microphone unit may be reduced.

In some embodiments, the microphone unit may include a record button. Upon the passenger pressing the record button, the record button may generate a record signal and transmit the record signal to the audio transducer. The audio transducer may receive the signal from the record button to record, at which point the audio transducer may convert the soundwaves to an electrical signal. The record button may include any user input means known in the art. For example, the record button may include, but are not limited to, a touchscreen, a lever, a switch, a bezel input device, or the like. In the case of a touchscreen, those skilled in the art should recognize that a large number of touchscreen interfaces may be suitable. For instance, a display device may be integrated with the touchscreen, such as, but not limited to, a capacitive touchscreen, a resistive touchscreen, a surface acoustic based touchscreen, an infrared based touchscreen, or the like. In a general sense, the touchscreen may include any interface integrated with the display. In another embodiment, the record button may include, but is not limited to, a bezel mounted interface.

In some embodiments, the microphone unit 202 may receive a signal from the aircraft network 212 by way of the communication interface 210, and begin recording in response to the signal. For example, the aircraft controller 214 may be configured to transmit a signal to the microphone unit 202 to initiate recording of the user voice. The signal may include a variety of signals transmitted by the aircraft network 212. For instance, the signal may be generated by the aircraft controller 214 in response to a landing of the aircraft for receiving a passenger feedback response associated with the flight. Thus, the microphone unit 202 may provide a means of receiving passenger feedback. By way of another instance, the signal received from the aircraft network may be a signal associated with flight or emergency, such as, a fasten seatbelt signal or a cabin-depressurization signal. Taking passenger recordings during such conditions may provide for flight analysis purposes and may be a final moment of the passenger in the event of a fatal crash.

In some embodiments, the microphone unit 202 may include a display device (not depicted). The display device may visually depict a recording in progress to notify the passenger that audio is being recorded. In some instances, the voice recording is limited to a set duration, such as a minute or less. The display device may include a timer indicating a remaining recording time left in the set duration. The display device may include any display device known in the art. For example, the display device may include, but are not limited to, a liquid crystal display (LCD), a light-emitting diode (LED) based display, an organic light-emitting diode (OLED) based display, an electroluminescent display (ELD), an electronic paper (E-ink) display, a plasma display panel (PDP), a display light processing (DLP) display, a cathode-ray tube (CRT), or the like. Those skilled in the art should recognize that a variety of display devices may be suitable for implementation in the present invention and the particular choice of display device may depend on a variety of factors, including, but not limited to, form factor, cost, and the like. In a general sense, any display device capable of integration with the user input device (e.g., touchscreen, bezel mounted interface, keyboard, mouse, trackpad, and the like) is suitable for implementation in the present invention. Furthermore, the memory 204 may be configured to provide display information to the one or more display devices and the processor 206 may be configured to execute various program instructions maintained on the memory 204. Such display device may be similarly implemented by an in-flight entertainment unit.

Although embodiments of the present disclosure are directed to the one or more display devices being coupled to the microphone unit in a common user interface housing, it is noted herein the one or more display devices may be indirectly coupled to the microphone unit. For example, the one or more display devices may be located at a distance, and may be communicatively coupled with the aircraft controller 214. In this regard, the display device may be implemented by a flight attendant panel. Therefore, the above description should not be interpreted as a limitation on the present disclosure but merely an illustration.

In some embodiments, the microphone unit 202 may further include a speaker (not depicted). The speaker may generate audio for transmission to the passengers, such as, but not limited to, a recording in progress indicator. Furthermore, the speaker may provide bi-directional communication functions between the passenger and flight crew.

One or more of the microphone unit, the aircraft controller 214, or the off-board controller may further be configured to perform voice recognition on the recorded voice signal. The aircraft controller 214 may include one or more processors or memory (not depicted). The memory may store a set of program instructions. The processor may be configured to execute the set of program instruction maintained on the memory to carry out one or more of the various steps described throughout the present disclosure. Thus, the recorded voice signal may be converted to electronic text. The electronic text may then be provided to a crew member, such as a flight attendant. For example, the electronic text may be provided to the crew member in the form of a message sent to a cellular phone or other portable electronic device of the crew member (e.g., a smart watch). By way of another example, the electronic text may be provided to the flight attendant panel. In this regard, the electronic text may provide supplementary information to a passenger call button displayed on the flight attendant panel.

Referring generally again to FIGS. 1 and 2.

Although much of the present disclosure is described in reference to the aircraft seat groups, this is not intended as a limitation on the present disclosure. In this regard, the present disclosure may similarly disclose an aircraft communication system, including, but not limited to, the microphone units, the aircraft network, and the aircraft controller. Furthermore, it is contemplated that the passenger voice recording may be performed by a mobile user device of the passenger, such as, but not limited to, a cellular phone. For example, the cellular phone may include a mobile application stored on a memory and executed by processor. The mobile application may access one or more components of the cellular phone, such as, but not limited to, an audio transducer, a touchscreen display, a speaker, or an antenna. The mobile application may prompt the passenger with a passenger feedback request by one or more of the or the speaker or the touchscreen display. The passenger may then input a passenger feedback response by one or more of the audio transducer or the touchscreen display in response to the feedback request. The mobile application may then transmit the passenger feedback response to the aircraft controller by the antenna.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

All of the methods described herein may include storing results of one or more steps of the method embodiments in memory. The results may include any of the results described herein and may be stored in any manner known in the art. The memory may include any memory described herein or any other suitable storage medium known in the art, such as, but not limited to a read-write memory. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period of time. For example, the memory may be random access memory (RAM), and the results may not necessarily persist indefinitely in the memory. By way of another example, the memory may be a non-volatile memory such as a solid-state drive, and the results may persist indefinitely for a year or more without power.

The memory may be housed in a common controller housing with the one or more processors. The memory may, alternatively or in addition, be located remotely with respect to the spatial location of the one or more processors, the audio transducer, the communication interface, or the aircraft controller. For instance, the one or more processors, the audio transducer, and/or the aircraft controller may access a remote memory (e.g., server), accessible through a network (e.g., internet, intranet, and the like) via one or more communication interfaces.

What is claimed:

1. An aircraft seat group comprising:
    a first aircraft seat and a second aircraft seat laterally adjacent to the first aircraft seat, each of the first aircraft seat and the second aircraft seat including a seat pan and a seat back, each of the first aircraft seat and the second aircraft seat configurable between an upright position and a lie-flat position;
    a center console disposed between the first aircraft seat and the second aircraft seat, the center console comprising an arm rest including a top surface disposed above the seat pan for resting an arm of a passenger sitting on the first aircraft seat, the center console further comprising a seat back divider disposed between the seat back of the first aircraft seat and the seat back of the second aircraft seat, the center console further comprising a deployable partition moveable within the seat back divider in a stowed state, the deployable partition including a fully deployed state; and
    a microphone unit embedded on the seat back divider adjacent to the seat back of the first aircraft seat, wherein the microphone unit is embedded on the seat back divider adjacent to a headrest of the seat back of the first aircraft seat when the first aircraft seat is in the upright position, wherein the microphone unit is disposed above the deployable partition, wherein the microphone unit does not interfere with movement of the deployable partition between the fully deployed state and the stowed state, the microphone unit comprising:
        a communication interface by which the microphone unit is communicatively coupled with an aircraft network, wherein the communication interface is configured to receive a signal from the aircraft network;
        an audio transducer configured to receive the signal from the communication interface and convert a soundwave generated by the passenger to an electrical signal, the soundwave converted to the electrical signal in response to receiving the signal from the communication interface; and
        a memory for storing the electrical signal associated with the soundwave generated by the passenger; wherein the communication interface is further configured to transmit the electrical signal to the aircraft network from the memory.

2. The aircraft seat group of claim 1, the fully deployed state providing a damping of a transmission of the soundwave generated by the passenger to the second aircraft seat.

3. The aircraft seat group of claim 1, wherein the signal is generated in response to a landing of the aircraft for receiving a passenger feedback response associated with the flight.

4. The aircraft seat group of claim 3, wherein the microphone unit further comprises a speaker; wherein the speaker is configured to generate a soundwave for a passenger feedback request between the communication network receiving the signal from the aircraft network and the audio transducer converting the soundwave to the electrical signal.

5. The aircraft seat group of claim 1, wherein the memory is configured to erase the electrical signal in response to transmission of the electrical signal to the aircraft network.

6. The aircraft seat group of claim 5, wherein the memory comprises a non-volatile memory configured to store the electrical signal associated with the soundwave and maintain the electrical signal in the memory subsequent to power-loss.

7. The aircraft seat group of claim 6, wherein the microphone unit is electrically powered from at least one of a power distribution system or a battery.

8. The aircraft seat group of claim 6, wherein the signal received from the aircraft network is a cabin-depressurization signal.

9. The aircraft seat group of claim 1, wherein the microphone unit further comprises a record button configured to generate a signal in response to the passenger pressing the record button, wherein the audio transducer is further configured to receive the signal from the record button and convert the soundwave generated by the passenger to the electrical signal in response to receiving the signal from the record button.

10. The aircraft seat group of claim 1, wherein the communication interface by which the microphone unit is communicatively coupled with the aircraft network comprises one of a wireless communication interface configured to transmit the electrical signal by a waveform in a frequency band between 2.4 and 5 GHz or a wireline communication interface.

11. The aircraft seat group of claim 1, wherein the microphone unit is embedded on the divider for receiving the soundwave generated by the passenger when the first seat is in the upright position.

12. The aircraft seat group of claim 1, wherein the microphone unit further comprises a processor configured to execute program instructions maintained on the memory, wherein the processor includes a voice-to-text module for converting the electrical signal associated with the soundwave generated by the passenger.

13. The aircraft seat group of claim 1, further comprising a privacy shell surrounding a rear portion of the seat back of the first aircraft seat and the seat back of the second aircraft seat.

14. The aircraft seat group of claim 13, wherein each of the first aircraft seat and the second aircraft seat face in a substantially similar direction.

15. The aircraft seat group of claim 1, further comprising an in-flight entertainment unit disposed on the arm rest, wherein the in-flight entertainment unit is disposed below the deployable partition.

16. An aircraft seat group comprising:
  a first aircraft seat and a second aircraft seat laterally adjacent to the first aircraft seat, each of the first aircraft seat and the second aircraft seat including a seat pan and a seat back, each of the first aircraft seat and the second aircraft seat configurable between an upright position and a lie-flat position;
  a center console disposed between the first aircraft seat and the second aircraft seat, the center console comprising an arm rest including a top surface disposed above the seat pan for a passenger sitting on the first aircraft seat to rest an arm, the center console further comprising a seat back divider, the center console further comprising a deployable partition moveable within the seat back divider in a stowed state, the deployable partition including a fully deployed state;
  an in-flight entertainment unit embedded on the arm rest, wherein the in-flight entertainment unit is disposed below the deployable partition, the in-flight entertainment unit communicatively coupled with an aircraft network, the in-flight entertainment unit comprising:
    a record button configured to generate a signal in response to the passenger pressing the record button;
    an audio transducer configured to receive the signal from the record button and convert a soundwave generated by the passenger to an electrical signal in response to receiving the signal from the record button;
    a memory for storing the electrical signal associated with the soundwave generated by the passenger; and
    a communication interface by which the in-flight entertainment unit is communicatively coupled with the aircraft network, wherein the communication interface is configured to transmit the electrical signal to the aircraft network; and
  a microphone unit embedded on the seat back divider adjacent to the seat back of the first aircraft seat, wherein the microphone unit is embedded on the seat back divider adjacent to a headrest of the seat back of the first aircraft seat when the first aircraft seat is in the upright position, wherein the microphone unit is disposed above the deployable partition, wherein the microphone unit does not interfere with movement of the deployable partition between the fully deployed state and the stowed state, the microphone unit comprising:
    a second communication interface by which the microphone unit is communicatively coupled with the aircraft network, wherein the second communication interface is configured to receive a signal from the aircraft network;
    a second audio transducer configured to receive the signal from the second communication interface and convert the soundwave generated by the passenger to an electrical signal in response to receiving the signal from the communication interface; and
    a second memory for storing the electrical signal associated with the soundwave generated by the passenger; wherein the second communication interface is further configured to transmit the electrical signal stored in the second memory to the aircraft network.

17. The aircraft seat group of claim 16, the in-flight entertainment unit further comprising a touchscreen display, wherein the record button is displayed on the touchscreen display, wherein the touchscreen display is configured to display a recording-in progress message subsequent to the signal generated by the record button.

* * * * *